(12) United States Patent
Kruppa

(10) Patent No.: US 7,178,984 B2
(45) Date of Patent: Feb. 20, 2007

(54) BEARING ARRANGEMENT FOR SUPPORTING A TRUNNION OF AN UNIVERSAL JOINT

(75) Inventor: Martin Kruppa, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 258 days.

(21) Appl. No.: 10/800,401

(22) Filed: Mar. 12, 2004

(65) Prior Publication Data

US 2004/0213490 A1   Oct. 28, 2004

Related U.S. Application Data

(63) Continuation of application No. PCT/EP02/09054, filed on Aug. 13, 2002.

(30) Foreign Application Priority Data

Sep. 14, 2001 (DE) ................. 101 45 536

(51) Int. Cl.
   *F16C 21/00* (2006.01)
(52) U.S. Cl. ................. 384/127; 384/126; 384/425; 464/11; 464/132
(58) Field of Classification Search ................. 384/127, 384/126, 425, 452, 548, 455, 454, 427; 464/11, 464/128, 132
See application file for complete search history.

(56) References Cited

U.S. PATENT DOCUMENTS

| | | | |
|---|---|---|---|
| 3,353,374 A | | 11/1967 | Buthenhoff |
| 3,950,834 A | * | 4/1976 | Pitner ................. 29/898.066 |
| 4,050,130 A | * | 9/1977 | Pitner ................. 29/898.07 |
| 4,317,341 A | * | 3/1982 | Krude ................. 464/11 |
| 4,637,740 A | * | 1/1987 | Olschewski et al. ........ 384/425 |
| 4,932,923 A | | 6/1990 | Thompson |
| 5,314,380 A | * | 5/1994 | Yamamoto ................. 464/11 |

FOREIGN PATENT DOCUMENTS

| | | |
|---|---|---|
| DE | 11 85 423 B | 1/1965 |
| DE | 73 02 217 U | 9/1973 |
| DE | 24 52 657 A1 | 5/1976 |
| DE | 90 05 935 U | 7/1990 |
| DE | 90 14 393 U1 | 2/1991 |
| DE | 195 10 761 A | 11/1995 |
| EP | 553584 A1 * | 8/1993 |
| FR | 22 56 691 A6 | 7/1975 |
| JP | 61-1 84 223 A | 8/1986 |
| JP | 61 184224 A | 8/1986 |

* cited by examiner

*Primary Examiner*—Richard Ridley
*Assistant Examiner*—Justin Krause
(74) *Attorney, Agent, or Firm*—Henry M. Feiereisen

(57) ABSTRACT

A bearing arrangement for supporting a universal joint trunnion in an outer cup includes a radial bearing having cylindrical rolling elements disposed between the trunnion and the outer cup, and a resistance member made of a material to allow elastic deformation and bearing upon a confronting surface area of an end surface of the trunnion. The resistance member and the trunnion are hereby so configured either alone or in combination as to form a large lubricant reservoir. Disposed at a distance to the end surface of the trunnion is a stop member to define an axial gap, whereby the stop member inhibits an axial movement of the trunnion after the trunnion has moved in axial direction to close the gap.

12 Claims, 4 Drawing Sheets

BEARING ARRANGEMENT FOR SUPPORTING A TRUNNION OF AN UNIVERSAL JOINT

CROSS-REFERENCES TO RELATED APPLICATIONS

This application is a continuation of prior filed copending PCT International application no. PCT/EP02/09054, filed Aug. 13, 2002, which designated the United States and on which priority is claimed under 35 U.S.C. §120, the disclosure of which is hereby incorporated by reference.

This application claims the priority of German Patent Application, Serial No. 101 45 536.4, filed Sep. 14, 2001, pursuant to 35 U.S.C. 119(a)–(d), the disclosure of which is incorporated herein by reference.

BACKGROUND OF THE INVENTION

The present invention relates, in general, to a bearing arrangement, and more particularly to a bearing arrangement for supporting a trunnion of a Cardan type universal joint pr the like.

German utility model DE 73 02 217 G describes a bearing arrangement for universal joints, which includes an axial bearing having a closed washer which is made of plastic. The washer forms in the center a contact surface in a direction of the trunnion and has a collar disposed in concentric surrounding relationship to the contact surface and has a shorter length than the contact surface so that a gap is defined between the collar and the end surface of the trunnion. Between the central contact surface and the peripheral collar, the washer is provided on the trunnion-facing side with recesses for introduction of lubricant. The so-formed lubricant reservoir is thus limited between the central contact surface and the peripheral collar to a narrow annular gap which is capable of receiving only a very small amount of lubricant.

It would therefore be desirable and advantageous to provide an improved bearing arrangement for a universal joint to obviate prior art shortcomings and to realize a greater lubricant reservoir.

SUMMARY OF THE INVENTION

According to one aspect of the present invention, a bearing arrangement for supporting a universal joint trunnion in an outer cup includes a radial bearing having cylindrical rolling elements disposed between the trunnion and the cup, and an axial bearing having a resistance member provided with a central axial projection for support of an end surface of the trunnion and having an outer surface resting against a bottom wall of the cup, wherein the resistance member is formed with openings or recesses spaced partially about its circumference for defining spaces for lubricant alone or in combination with a configuration of the end surface of the trunnion, and wherein the resistance member is provided about its circumference with first stop members projecting axially toward the end surface of the trunnion and defined by a length which is shorter than a length of the axial projection as to define a gap between the stop members and a confronting portion of the end surface of the trunnion.

According to another aspect of the present invention, a bearing arrangement for supporting a universal joint trunnion in an outer cup includes a radial bearing having cylindrical rolling elements disposed between the trunnion and the cup, and an axial bearing having a resistance member disposed in concentric surrounding relationship to a central flange of the trunnion for support thereof and having an outer surface resting against a bottom wall of the cup, wherein the resistance member is formed with first stop members projecting axially toward the end surface of the trunnion and defined by a length which is shorter than a length of the flange as to define an axial gap between the stop members and a confronting portion of the end surface of the trunnion, and wherein the resistance member defines in combination with a configuration of the end surface of the trunnion spaces for introduction of lubricant.

The present invention resolves prior art problems by a novel and inventive configuration of the end surface of the trunnion and the use of an resistance member which is made, preferably, of elastic material. As a result, the space for receiving lubricant is increased within the cup. The resistance member is hereby provided with circumferentially spaced-apart openings, pockets or recesses which are formed continuously or unilaterally in the resistance member, and the trunnion is configured such as to significantly enlarge the space for introduction of lubricant. The resistance member defines a lubricant reservoir which extends axially from the end surface of the trunnion to at least the bottom wall of the cup and is bounded in radial direction by the central projection of the resistance member and partly by the inner wall of the cup. This configuration thus greatly increases the available lubricant volume so as to positively affect the service life of the cup.

The provision of stop members of shorter length compared to the central projection so as to define a gap between the trunnion and the stop members results in at least a two-phased, progressive support of the trunnion, when subjected to an increased axial force, and thus enables the bottom wall of the cup to transmit a greater axial force while the bottom wall of the cup can have a relatively small stiffness in the lower load range. The trunnion abuts at slight load in mid-section of the thin-walled and thus elastic bottom wall of the cup. As the load increases, the configuration of the resistance member enables a radial support in the peripheral and more rigid marginal zone of the end wall.

The resistance members may be guided on their outside directly upon the inner wall or a bottom wall portion of the cup. The resistance member may extend across the entire area of the bottom wall of the cup and cover the end surface of the trunnion at the same time, so that the trunnion is indirectly supported by the bottom wall of the cup. As an alternative, the resistance member may be supported directly upon the bottom wall of the cup, whereby the resistance member is disposed here in concentric surrounding relationship to a central, axial flange of the trunnion.

According to another feature of the present invention, the trunnion may have a bore in the end surface of the trunnion, with the axial projection being constructed for engagement in the bore of the trunnion. One option involves an engagement of the axial projection with clearance in the bore of the trunnion to thereby form a circular ring shaped space for use a lubricant reservoir. Another option involves a press-fitting engagement of the axial projection in the bore of the trunnion. It is also possible to configure the end surface of the trunnion in a stepped shape, whereby the axial projection of the resistance member is press-fitted in the stepped bore with smallest diameter. This construction simplifies assembly as the resistance member is held captive on the trunnion.

According to another feature of the present invention, the resistance member allows a two-step support of the trunnion upon the bottom wall, when the trunnion is acted upon by an axial force. Suitably, the resistance member may have second stop members disposed in alternating relationship to the first stop members, whereby the first and second stop members have different lengths. In this way, the trunnion can be borne by a three-phased support upon the resistance member and the bottom wall of the cup in dependence on the applied axial force of the trunnion. This construction subjects the bottom wall of the cup to less stress thereby increasing the service life of the cup.

The resistance member can be guided and centered on the inner wall of the cup. This configuration allows the resistance member to form an axial stop for the rolling elements.

According to another feature of the present invention, the bottom wall of the cup may be made without material removal with a gradation which ends in an axial surface area of a size that corresponds to a size of a surface area of the confronting axial projection. The gradation, resembling a crimp, improves the stiffness and thus the strength of the bottom wall which thus lasts longer without changing the wall thickness.

According to another feature of the present invention, the bottom wall of the cup has a side distal to the end surface of the trunnion, whereby this side of the bottom wall may be formed with a stepped configuration. The resistance member can hereby be centered at the step where the bottom wall is of smallest diameter, whereby the axial projection of the resistance member has an axial length which is greater than a vertical dimension of the step so as to provide a support surface for the trunnion. In addition, the axial projection is arranged so that a gap is established between the end surface of the trunnion and a step of the bottom wall. This construction results in a stepped support of the trunnion in dependence on the applied axial force.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
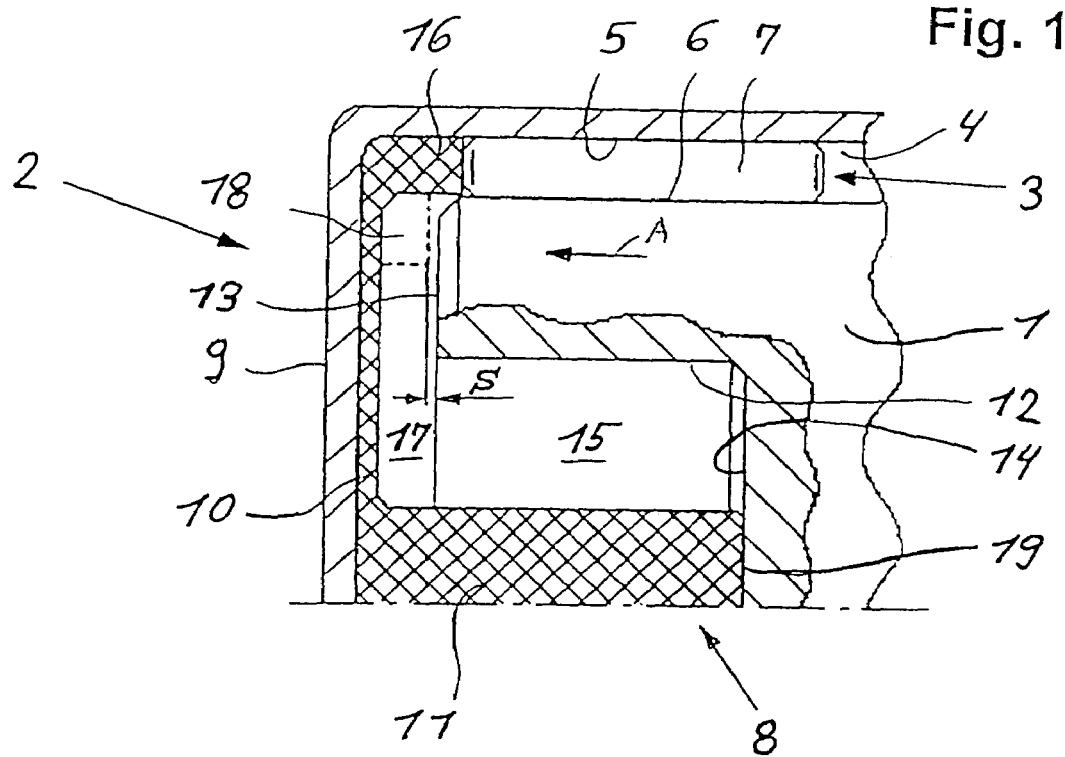
FIG. 1 is a half-section of a first embodiment of a bearing arrangement according to the present invention for support of a universal joint trunnion in a outer cup.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a half-section of a first embodiment of a bearing arrangement according to the present invention for support of a universal joint trunnion 1 in an outer cup 2 which is made through a manufacturing process without material removal. As the structure of a universal joint is generally known to a person skilled in the art, for sake of simplicity, the following description will relate only to those parts of the universal joint that are necessary for the understanding of the present invention.

The bearing arrangement includes a radial bearing, generally designated by reference numeral 3 and having a plurality of cylindrical rolling elements 7 which are disposed in an annular gap 6 as bounded by a wall 5 of the outer cup 2 and an outer surface area 6 of the trunnion 1. In addition, the bearing arrangement includes a thrust bearing, generally designated by reference numeral 8 and including a substantially disk-shaped resistance member 10 which rests flatly against a bottom wall 9 of the cup 2 and is centered by the wall 5 of the cup 2. The resistance member 10 is formed with a central axial projection 11 which is received in a bore 12 of the trunnion 1. The trunnion 1 has here a substantially U-shaped end configuration with an axially recessed base 14 and an end surface 13, with the axial projection 11 abutting against an end surface 19 of the base 14. The bore 12 has a diameter which is greater than a diameter of the projection 11 so that an enclosing ring space 15 is formed.

About its periphery, the resistance member 10 has a collar 16 which extends in the direction of the rolling elements 7 to provide an axial stop for the rolling elements 7. The collar 16 further demarcates a ring-shaped recess 17 which is established between the projection 11 and the collar 16.

As further indicated by a dashed line, plural stop members 18 (only one is shown here) extend radially inwardly from the collar 16 in spaced-apart relation about the circumference of the collar 16. The stop members 18 are sized such that a gap s is defined between the end surface 13 of the trunnion 1 and the stop member 18, when the bearing arrangement is assembled. The gap s allows an indexed support of the trunnion 1 in the outer cup 2. In other words, when the trunnion 1 is exposed to an axial force in the direction of arrow A, an elastic deformation of the projection 11 takes place first as a result of the abutting relationship between the projection 11 and the trunnion 1. After moving in axial direction far enough to close the gap s, the trunnion 1 abuts with its end surface 13 against the stop members 18 of the resistance member 10. Thus, the bottom wall 9 is not exposed to an inadmissible excessive central load and the trunnion 1 is supported across a greater area by the bottom wall 9 of the cup 2. The ring space 15 in the trunnion 1 and the recess 17 in the resistance member 10 define together spaces or chambers that can be utilized as lubricant reservoirs. The size of these spaces can be large enough to eliminate the need for re-lubrication of the cup 2. In other words, a maintenance-free outer cup 2 can be implemented.

Figure 2:
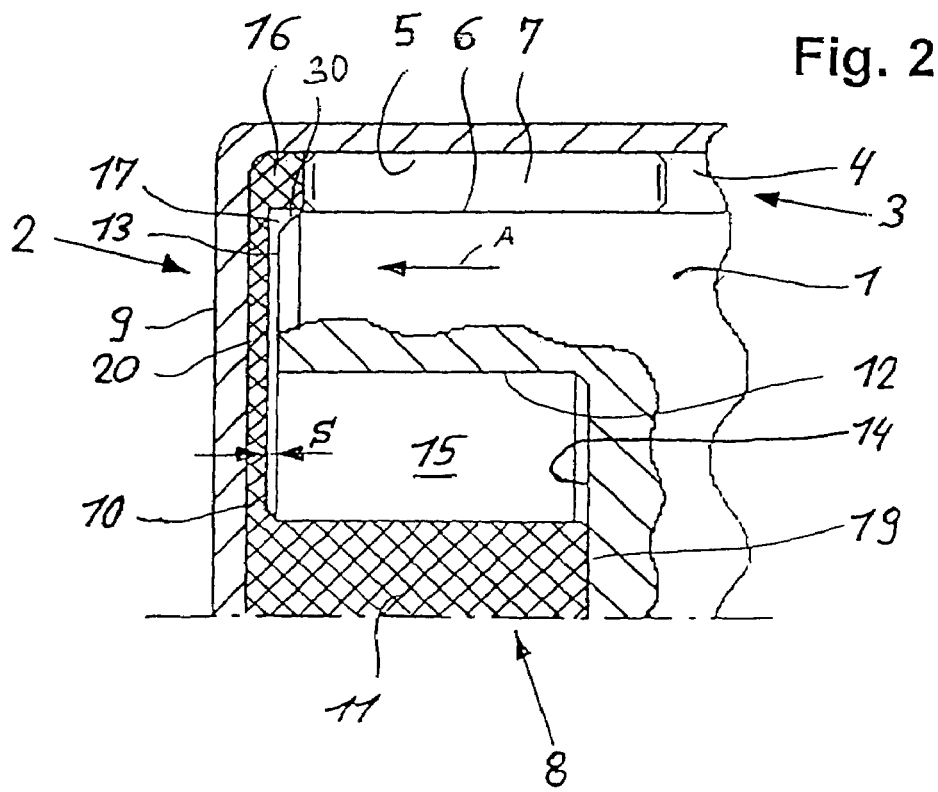
FIG. 2 is a half-section of a second embodiment of a bearing arrangement according to the present invention for support of a universal joint trunnion in a outer cup.

FIG. 2 shows a half-section of a yet another embodiment of a bearing arrangement according to the present invention. Parts corresponding with those in FIG. 1 are denoted by identical reference numerals and not explained again. The description below will center on the differences between the embodiments. This embodiment is characterized by the absence of a stop member 18 so that the end surface 13 of the trunnion 1 is ultimately supported by an end wall portion 20 of the resistance member 10 between the projection 11 and the collar 16, after an elastic deformation of the projection 11 by an axial force acting in the direction of arrow A has taken place. As a consequence of the absence of stop members, the collar 16 can be shortened in axial length so that the resistance member 10 is more compact and results also in a more compact outer cup 2. In addition to the ring space 15, the lubricant reservoir includes also the ring-shaped space 17 which is defined between the collar 16 and a chamfered edge 30 of the end surface 13.

Figure 3:
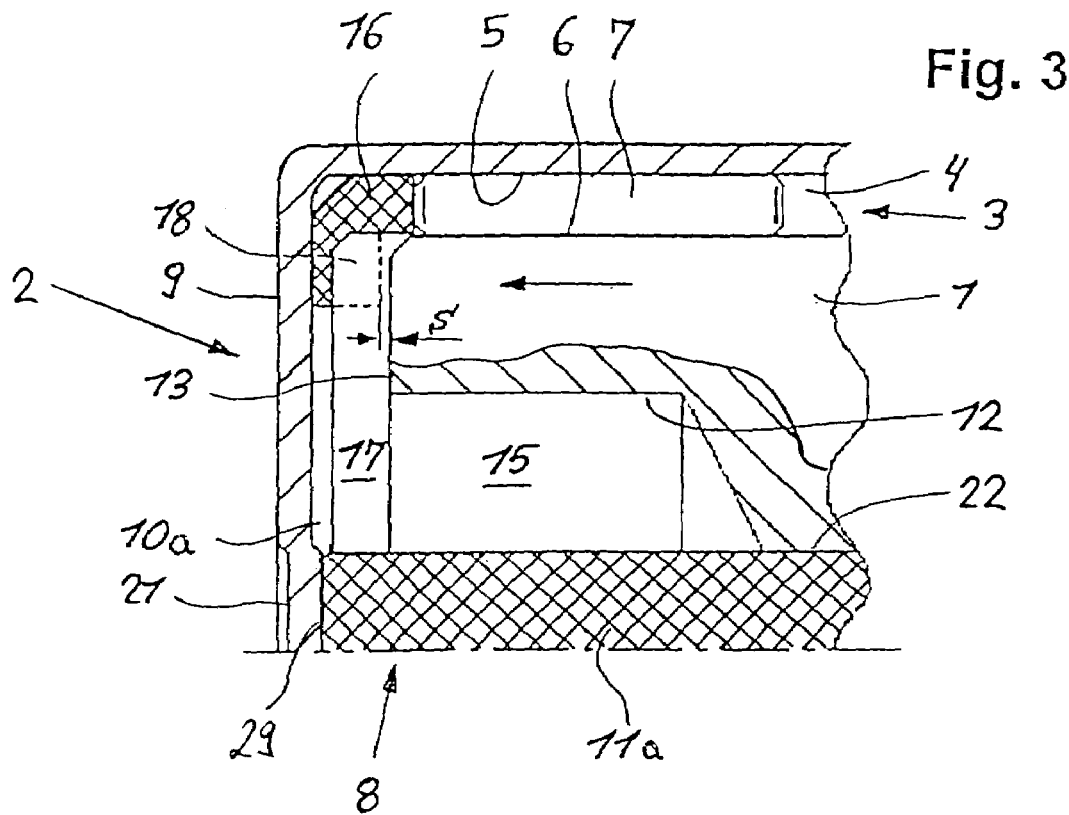
FIG. 3 is a half-section of a third embodiment of a bearing arrangement according to the present invention for support of a universal joint trunnion in a outer cup.

FIG. 3 shows a half-section of a still another embodiment of a bearing arrangement according to the present invention. In the following description, parts that differ from the parts shown in FIG. 1 will be identified by corresponding reference numerals followed by an "a". In this embodiment, the bottom wall 9 of the cup 2 is formed with an inwardly directed gradation 21 to define an abutment area 29. The bearing arrangement has a resistance member 10a for centered support on the inside of the gradation 21. The resistance member 10a has an axial projection 11a which has one end resting against the abutment area 29 of the gradation 21 and another end which is press-fitted in a bore 22 of the base 14 of the trunnion 1. Thus, the resistance member 10a is held captive on the trunnion 1 to allow provision of a prefabricated unitary structure which is easy to install and allows automated assembly of the outer cup 2.

Figure 4:
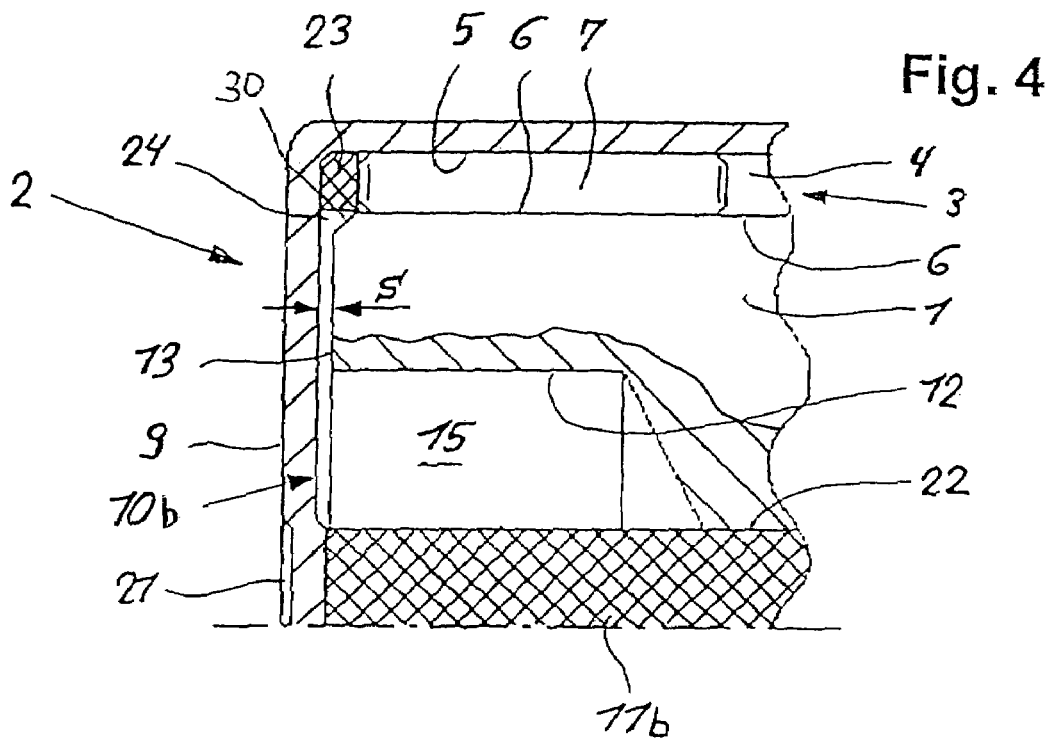
FIG. 4 is a half-section of a fourth embodiment of a bearing arrangement according to the present invention for support of a universal joint trunnion in a outer cup.

FIG. 4 shows a half-section of still another embodiment of a bearing arrangement according to the present invention. Parts that differ from the parts shown in FIG. 1 will be identified by corresponding reference numerals followed by a "b". In this embodiment, the bearing arrangement has a resistance member 10b of two part construction, with one part formed by the axial projection 11b which, in analogy to the embodiment of FIG. 3, is press-fitted in the bore 22 of the base 14 of the trunnion 1 and supported upon the abutment area 29 of the gradation 21. The other part of the resistance member 10b is formed by a ring element 23 which is placed against the inside of the wall 5 in a centered manner to provide an axial stop for the rolling elements 7. The lubricant reservoir is provided here by the ring space 15 in the trunnion 1 and an intermediate space 24 which is defined between the bottom wall 9 of the cup 2 and the end surface 13 of the trunnion 1. The intermediate space 24 has hereby a width which is characterized by the gap s. Thus, an axial force acting upon the trunnion 1 in the direction of arrow A is first absorbed by the projection 11b and transmitted via the gradation 21 into the bottom wall 9 of the cup 2. A further increase in the axial force results in an elastic deformation of the projection 11b until the end surface 13 of the trunnion 1 is forced against the bottom wall of the cup 2.

Figure 5:
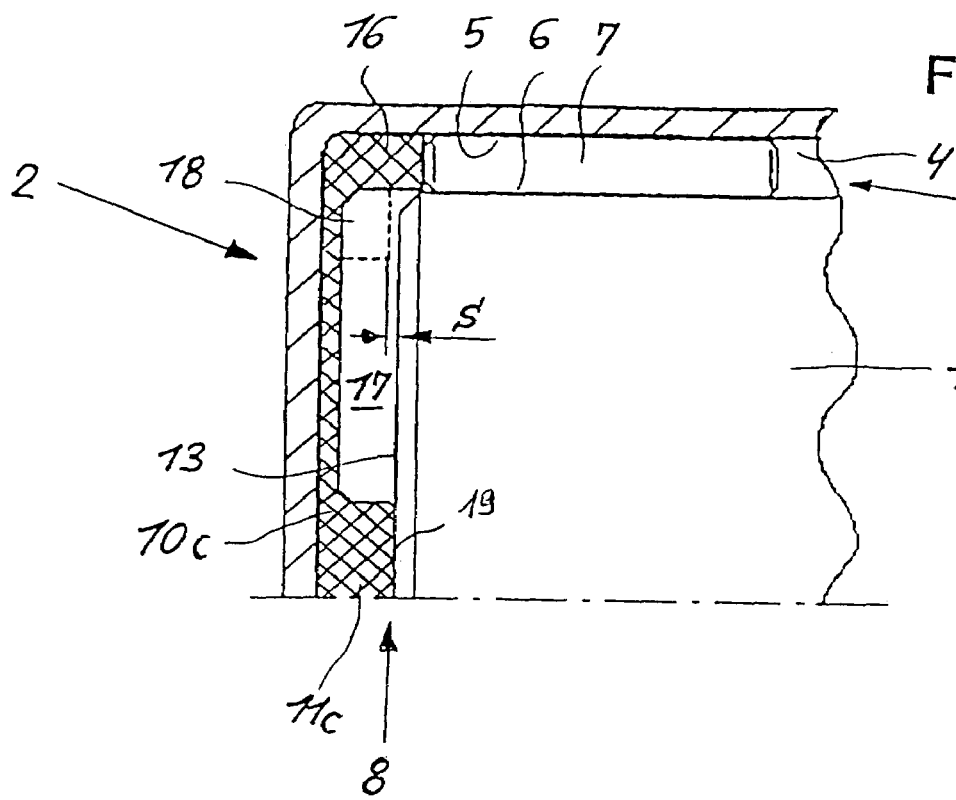
FIG. 5 is a half-section of a fifth embodiment of a bearing arrangement according to the present invention for support of a universal joint trunnion in a outer cup.

FIG. 5 shows a half-section of still another embodiment of a bearing arrangement according to the present invention. Parts that differ from the parts shown in FIG. 1 will be identified by corresponding reference numerals followed by a "c". In this embodiment, the trunnion 1 has a cylindrical end surface 13 so that the lubricant reservoir is formed entirely by the recess 17. The bearing arrangement has a resistance member 10c which has a central axial projection 11c which is of shorter axial length and supports the end of the trunnion 1 in the area of the end surface 19. Thus, the size of the recess 17 is directly impacted by the axial length of the projection 11c.

Figure 6:
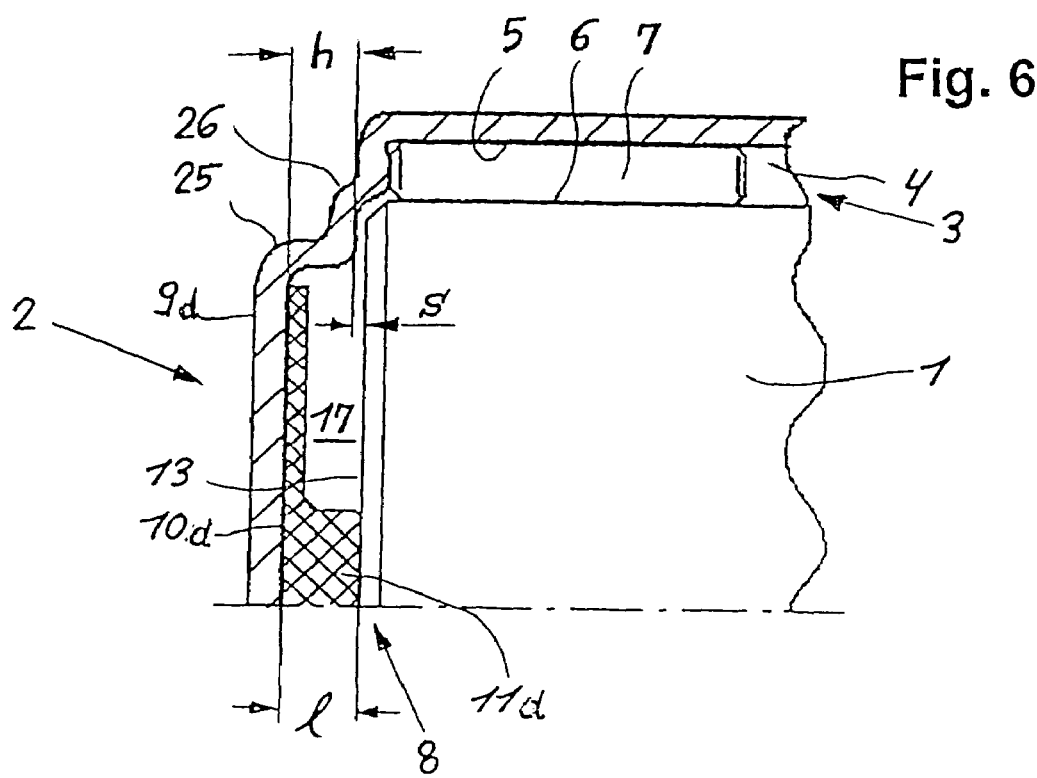
FIG. 6 is a half-section of a sixth embodiment of a bearing arrangement according to the present invention for support of a universal joint trunnion in a outer cup.

FIG. 6 shows a half-section of still another embodiment of a bearing arrangement according to the present invention. Parts that differ from the parts shown in FIG. 1 will be identified by corresponding reference numerals followed by a "d". In this embodiment, the outer cup 2 has a bottom wall 9d of stepped configuration to define a step 25 of smaller inner diameter and a step 26 of greater inner diameter. The bearing arrangement includes a resistance member 10d which is centered against the step 25 and has a central axial projection 11d of a length l which is greater than a height h of the stepped configuration. This assures a guiding of the trunnion 1 on the end surface 19 of the projection 11d, and that the end surface 13 of the trunnion 1 is supported on the step 26 of the bottom wall 9 only when the axial force exceeds a certain level and the projection 11d has undergone an elastic deformation. The lubricant reservoir is again formed solely by the recess 17 which is demarcated in radial direction by the outer surface area of the projection 11d and the bottom wall 9 in the area of the step 25.

Figure 7:
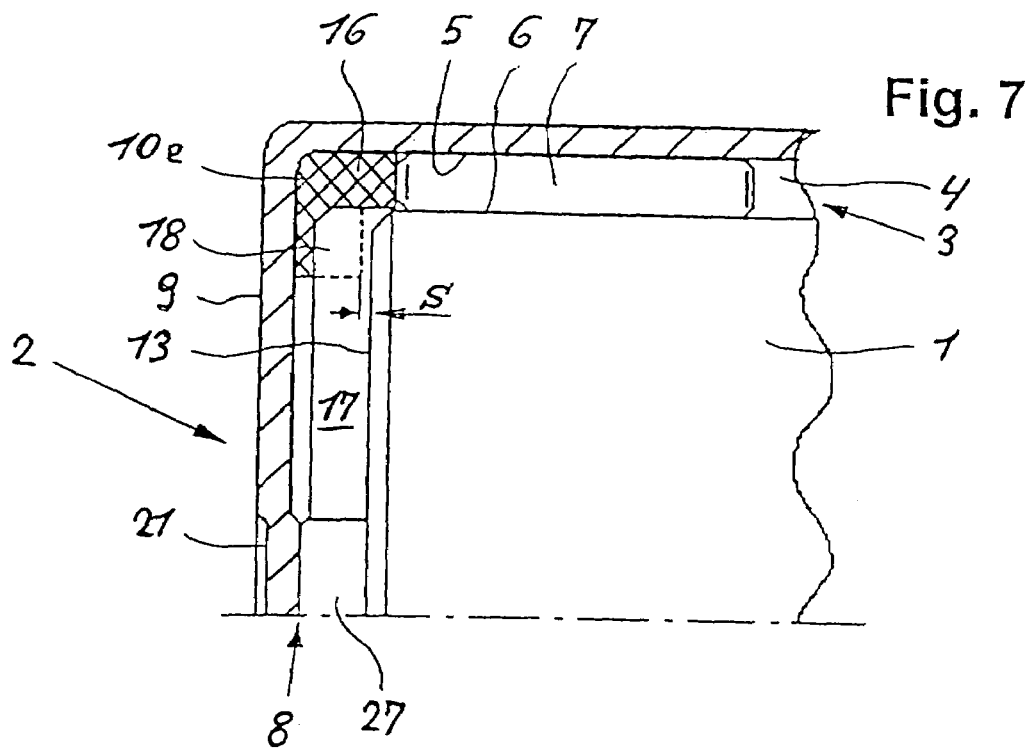
FIG. 7 is a half-section of a seventh embodiment of a bearing arrangement according to the present invention for support of a universal joint trunnion in a outer cup.

FIG. 7 shows a half-section of still another embodiment of a bearing arrangement according to the present invention. Parts that differ from the parts shown in FIG. 1 will be identified by corresponding reference numerals followed by an "e". In this embodiment, the bearing arrangement has a resistance member 10e which is characterized by the absence of a centered axial projection but includes only a ring element to form the collar 16 centered at the wall 5 of the cup 2 and abutting against the rolling elements 7. Extending radially inwardly from the collar 16 are the stop members 18 in analogy to the embodiment of FIG. 1 so as to provide the support of the trunnion 1 when the axial force on the trunnion 1 is at a certain level. The cup 2 is formed with the gradation 21 for support of a central flange 27 extending axially from the end surface 13. The lubricant reservoir is formed here by the ring-shaped space 17 demarcated by the collar 16, flange 27 and the end surface 13 of the trunnion 1 and having a volume directly dependent on the axial length of the flange 27.

Figure 8:
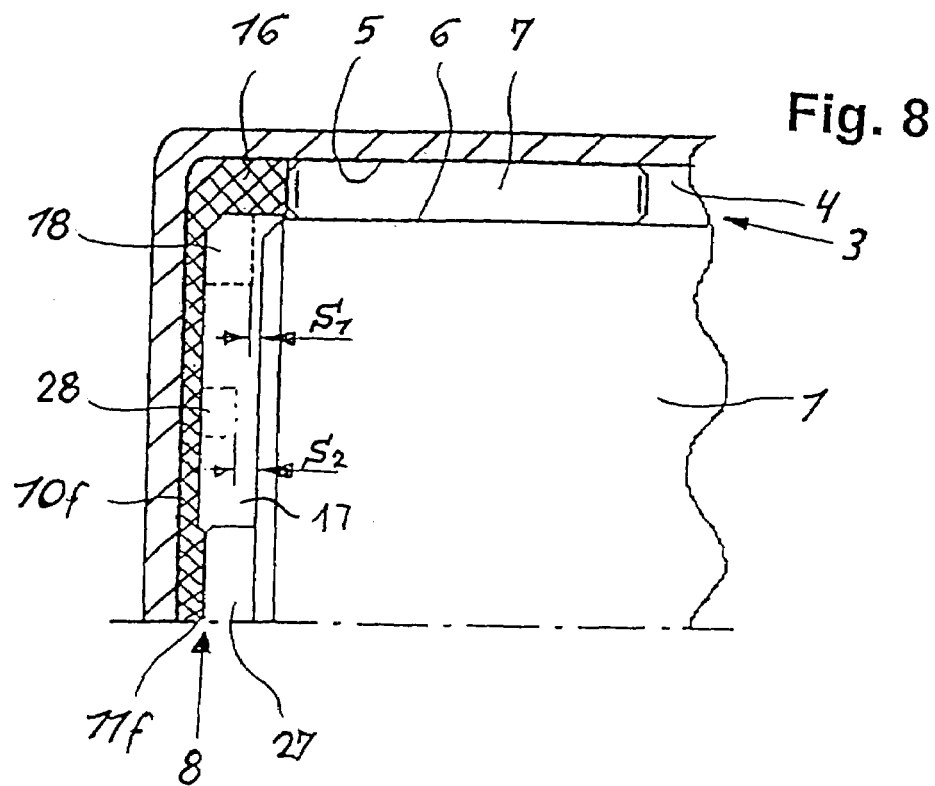
FIG. 8 is a half-section of an eighth embodiment of a bearing arrangement according to the present invention for support of a universal joint trunnion in a outer cup.

FIG. 8 shows a half-section of still another embodiment of a bearing arrangement according to the present invention. Parts that differ from the parts shown in FIG. 1 will be identified by corresponding reference numerals followed by an "f". In this embodiment, the bearing arrangement has a resistance member 10f having a central axial projection 11f of short axial extension for support of the flange 27 of the trunnion 1. The lubricant reservoir is formed here by the substantially circular ring-shaped space 17 of a volume determined by the axial lengths of the projection 11f and the flange 27. In addition to the stop members 18, the resistance member 11f includes further stop members 28 of different axial length than the stop members 18 so that different gap sizes $s_1$ and $s_2$ are defined between the end surface 13 of the trunnion 1 and the resistance member 11f. This construction effects a multi-indexed support of the trunnion 1 upon the resistance member 10f and the bottom wall 9 of the cup in dependence on the applied axial force.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A bearing arrangement for supporting a universal joint trunnion in an outer cup, comprising:
   a radial bearing having cylindrical rolling elements disposed between the trunnion and the cup; and
   an axial bearing having a resistance member provided with an outer circumferential surface a central axial projection for support of an end surface of the trunnion and having an outer surface extending coextensively with and resting flatly against a bottom wall of the cup, the resistance member has a recess extending axially and circumferentially between the central axial projection and the outer circumferential surface defining a reservoir for lubricant, and wherein the resistance member is provided circumferentially with first stop members projecting axially toward the end surface of the trunnion and defined by a length which is shorter than a length of the central axial projection as to define a gap between the stop members and a confronting portion of the end surface of the trunnion.

2. The bearing arrangement of claim 1, wherein the trunnion has a bore in the end surface of the trunnion, said central axial projection being constructed for engagement in the bore of the trunnion.

3. The bearing arrangement of claim 2, wherein the central axial projection is constructed for engagement with clearance in the bore of the trunnion.

4. The bearing arrangement of claim 2, wherein the central axial projection is press-fitted in the bore of the trunnion.

5. The bearing arrangement of claim 1, wherein the resistance member has second stop members disposed in alternating relationship to the first stop members, said second stop members having a length which differs from the length of the first stop members.

6. The bearing arrangement of claim 1, wherein the resistance member of the central axial bearing is constructed to allow a multi-stepped support of the trunnion, when the trunnion is acted upon by an axial force.

7. The bearing arrangement of claim 1, wherein the resistance member forms an axial stop for the rolling elements.

8. The bearing arrangement of claim 1, wherein the bottom wall of the cup is formed without material removal with a gradation which ends in an axial surface area of a size that corresponds to a size of a surface area of the confronting central axial projection.

9. The bearing arrangement of claim 1, wherein the trunnion has a flange projecting in central axial direction from the end surface, wherein the bottom wall of the cup is formed without material removal with a gradation which ends in an axial surface area of a size that corresponds to a size of a surface area of the confronting flange.

10. The bearing arrangement of claim 1, wherein the bottom wall of the cup has a side distal to the end surface of the trunnion, said side of the bottom wall being formed with at least one step.

11. The bearing arrangement of claim 10, wherein the resistance member is centered at the step where the bottom wall is of smallest diameter, and wherein the central axial projection of the resistance member has an axial length which is greater than a height of the step.

12. The bearing arrangement of claim 1, wherein the resistance member is made of two parts, one part being the central axial projection and the other part being a ring element centered on the bottom wall of the cup.

* * * * *